(12) United States Patent  (10) Patent No.: US 8,723,064 B2
Cheng et al.  (45) Date of Patent: May 13, 2014

(54) BUTTON MECHANISM AND ELECTRONIC DEVICE THEREOF

(75) Inventors: Yen-Chang Cheng, New Taipei (TW); Chih-Peng Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 106 days.

(21) Appl. No.: 13/596,058

(22) Filed: Aug. 28, 2012

(65) Prior Publication Data

US 2013/0134024 A1 May 30, 2013

(30) Foreign Application Priority Data

Nov. 24, 2011 (TW) .............................. 100143093 A

(51) Int. Cl.
*H01H 3/00* (2006.01)
(52) U.S. Cl.
USPC ........................................................ 200/329
(58) Field of Classification Search
USPC ................. 200/5 A, 329, 537, 547–551, 296, 200/330–331, 17 R, 43.04, 338
See application file for complete search history.

(56) References Cited

U.S. PATENT DOCUMENTS 7,208,692 B2 * 4/2007 Yamaguchi .................. 200/547
7,679,017 B1 * 3/2010 Tsai .............................. 200/547
8,319,135 B2 * 11/2012 Chen et al. .................... 200/547

FOREIGN PATENT DOCUMENTS

TW 200949882 12/2009
TW M393779 12/2010

OTHER PUBLICATIONS

Office action mailed on Sep. 30, 2013 for the Taiwan application No. 100143093, filing date: Nov. 24, 2011, p. 2 and p. 3 line 1~21.

* cited by examiner

*Primary Examiner* — Edwin A. Leon
(74) *Attorney, Agent, or Firm* — Winston Hsu; Scott Margo

(57) ABSTRACT

A button mechanism includes a casing. A lock hole and an engaging portion are formed and disposed on a bottom of the casing, and a plurality of open slots is formed on a lateral wall of the casing. The button mechanism further includes a plurality of buttons respectively disposed on the corresponding open slots, a fixing component, and a supporting component. An end of the supporting component is engaged with the engaging portion. The supporting component includes a first part whereon a piercing hole is formed. The fixing component pierces through the piercing hole and the lock hole to fix the first part on the bottom of the casing. The supporting component further includes a second part connected to the first part and contacting against the plurality of first buttons for constraining movements of the plurality of buttons relative to the casing.

20 Claims, 10 Drawing Sheets

BUTTON MECHANISM AND ELECTRONIC DEVICE THEREOF

BACKGROUND OF THE INVENTION

1. Field of the Invention

The present invention relates to a button mechanism and an electronic device thereof, and more particularly, to a button mechanism having preferable assembly yield and low manufacturing cost and an electronic device thereof.

2. Description of the Prior Art

A conventional electronic device includes a plurality of button mechanism, such as a power button, a volume controller and a lock button, for being the controlling switches due to operation of the electronic device. Assembly of the conventional button mechanism is complicated, and each button mechanism is disposed on a casing of the electronic device by its independent fixing component and supporting component. That is to say, the casing provides space for accommodating three sets of the fixing component and the supporting component when the electronic device includes three button mechanisms with different functions. The three sets of the fixing component and the supporting component are respectively for disposing the button mechanism on the corresponding position inside the casing. However, the electronic device does not have enough space to accommodate the various sets of the fixing component and the supporting component with a trend of portable design. Design of a button mechanism having easy assembly for space economy and an electronic device thereof is an important issue in the electronics industry.

SUMMARY OF THE INVENTION

The present invention provides a button mechanism having preferable assembly yield and low manufacturing cost and an electronic device thereof for solving above drawbacks.

According to the claimed invention, a button mechanism includes a casing. An engaging portion is disposed on a bottom of the casing, a lock hole is formed on the bottom of the casing, and a plurality of open slots is formed on a lateral wall of the casing. The button mechanism further includes a plurality of buttons movably disposed on the corresponding open slots. The plurality of buttons includes at least one first button and at least one second button, and a shape of the first button is substantially different from a shape of the second button. The button mechanism further includes a fixing component and a supporting component. An end of the supporting component is engaged with the engaging portion of the casing. The supporting component includes a first part and a second part. A piercing hole is formed on a surface of the first part, and the fixing component pierces through the piercing hole and being locked on the lock hole for fixing the first part on the bottom of the casing. The second part is connected to the first part and contacting against the plurality of buttons for constraining movements of the plurality of buttons relative to the lateral wall of the casing.

According to the claimed invention, a plurality of sunken portions is disposed on a lateral surface of the second part adjacent to the casing, a position of each sunken portion corresponds to the corresponding open slot, and the plurality of buttons is respectively engaged with the corresponding sunken portion.

According to the claimed invention, a contacting structure is disposed on an upper edge of the second part of the supporting component for constraining movements of the plurality of buttons relative to the second part.

According to the claimed invention, the contacting structure protrudes from a lateral surface of the second part.

According to the claimed invention, an open hole is further formed on the surface of the first part of the supporting component, and the open hole sheathes on a boss of the casing.

According to the claimed invention, a cleave hole is formed on the second part and at a position corresponding to the second button. The cleave hole faces an electronic component of a circuit board.

According to the claimed invention, a sunken slot is formed on the second part and at a position corresponding to the first button. A conductive component is disposed inside the sunken slot.

According to the claimed invention, the first button includes a first body, two pressing portions and two actuating portions. A middle of the first body contacts against the conductive component disposed inside the sunken slot. The pressing portions are respectively disposed on two ends of a side of the first body, and each pressing portion protrudes from the open slot. The actuating portions are respectively disposed on two ends of the other side of the first body, and each actuating portion is for actuating a switch of a circuit board.

According to the claimed invention, the second button includes a second body, a pushing portion and a buckling portion. A rib structure is disposed on a surface of the second body adjacent to the supporting component, and the second body slides relative to the second part of the supporting component via the rib structure. The pushing portion is disposed on a side of the second body, and the pushing portion protrudes from the open slot. The buckling portion is disposed on the other side of the second body for buckling the switch of the circuit board.

According to the claimed invention, the second button further includes a contacting portion disposed on a low edge of the second body for contacting against the casing.

According to the claimed invention, the button mechanism comprises one first button and two second buttons, each second button is slidably disposed inside the corresponding open slot of the casing and located between the casing and the second part of the supporting component.

According to the claimed invention, an electronic device includes a button mechanism and a circuit board. The button mechanism includes a casing. An engaging portion is disposed on a bottom of the casing, a lock hole is formed on the bottom of the casing, and a plurality of open slots is formed on a lateral wall of the casing. The button mechanism further includes a plurality of buttons movably disposed on the corresponding open slots. The plurality of buttons includes at least one first button and at least one second button, and a shape of the first button is substantially different from a shape of the second button. The button mechanism further includes a fixing component and a supporting component. An end of the supporting component is engaged with the engaging portion of the casing. The supporting component includes a first part and a second part. A piercing hole is formed on a surface of the first part, and the fixing component pierces through the piercing hole and being locked on the lock hole for fixing the first part on the bottom of the casing. The second part is connected to the first part and contacting against the plurality of buttons for constraining movements of the plurality of buttons relative to the lateral wall of the casing. The circuit board is disposed on the supporting component. The circuit board includes a plurality of switches, and the first button and the second button are respectively for driving the corresponding switches.

The present invention utilizes one supporting component to fix the plurality of buttons (the first button and the second buttons) for economizing the structural space of the electronic device. The casing, the supporting component and the buttons are integrated to be modularization, so that the button mechanism of the present invention has advantages of easy assembly and low manufacturing cost. A production yield of the present invention can be increased due to modularization design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
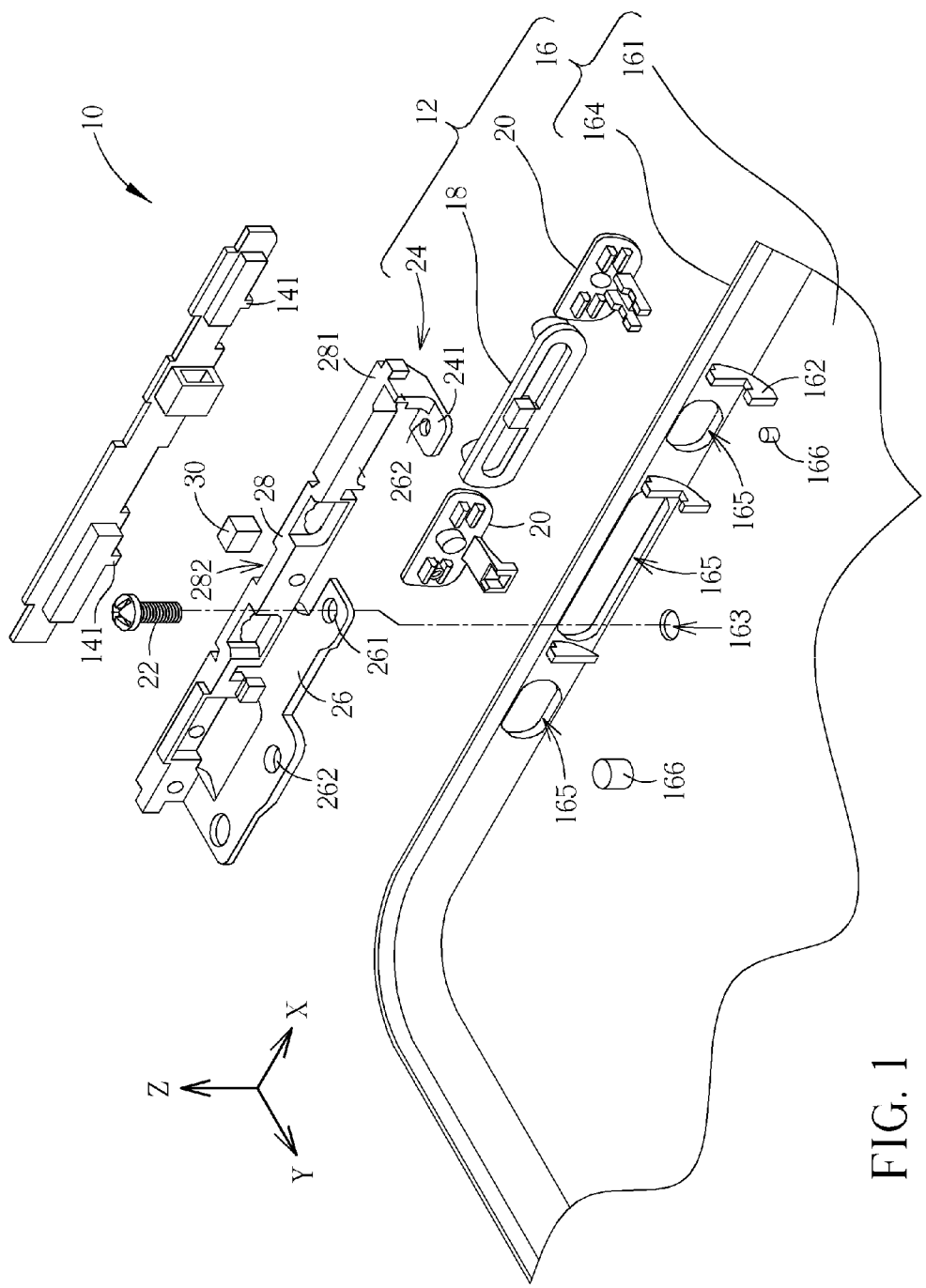
FIG. 1 is an exploded diagram of an electronic device according to an embodiment of the present invention.
Figure 2:
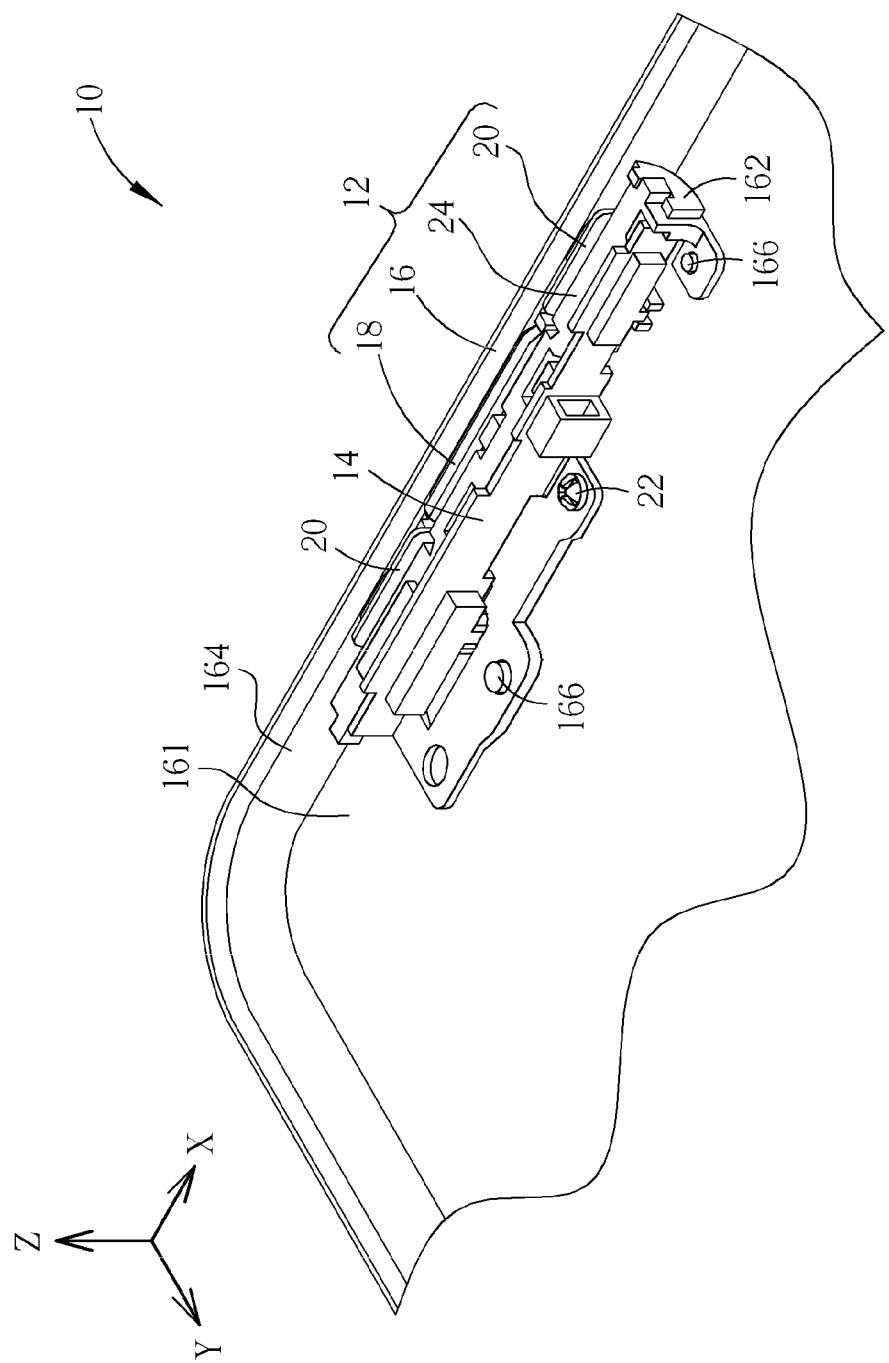
FIG. 2 is an assembly diagram of the electronic device according to the embodiment of the present invention.

Please refer to FIG. 1 and FIG. 2. FIG. 1 is an exploded diagram of an electronic device 10 according to an embodiment of the present invention. FIG. 2 is an assembly diagram of the electronic device 10 according to the embodiment of the present invention. The electronic device 10 includes a button mechanism 12 and a circuit board 14. A plurality of independent button structures can be integrated by the button mechanism 12. The circuit board 14 can be an integrated circuit board, and includes a plurality of switches 141 which corresponds to the plurality of button structures. Therefore, the present invention can utilize the circuit board 14 with the button mechanism 12 for economizing structural space of the electronic device 10.

The button mechanism 12 includes a casing 16, and the casing 16 can be a shell of the electronic device 10. An engaging portion 162 can be disposed on a bottom 161 of the casing 16, a lock hole 163 can be formed on the bottom 161 of the casing 16, and a plurality of open slots 165 can be formed on a lateral wall 164 of the casing 16. The bottom 161 can support the other electronic components of the electronic device 10. The lateral wall 164 and the bottom 161 can intersect to each other, and the buttons can be disposed on the lateral wall 164 for easy operation. The plurality of buttons of the button mechanism 12 can include one first button 18 and two second buttons 20. The first button 18 can be a press button movably disposed inside the corresponding open slot 165. The second button 20 can be a slide button slidably disposed inside the corresponding open slot 165. A shape of the first button 18 can be substantially different from shapes of the second buttons 20, and positions of the first button 18 and the second buttons 20 are not limited to the above-mentioned embodiment, and depend on design demand.

Figure 3:
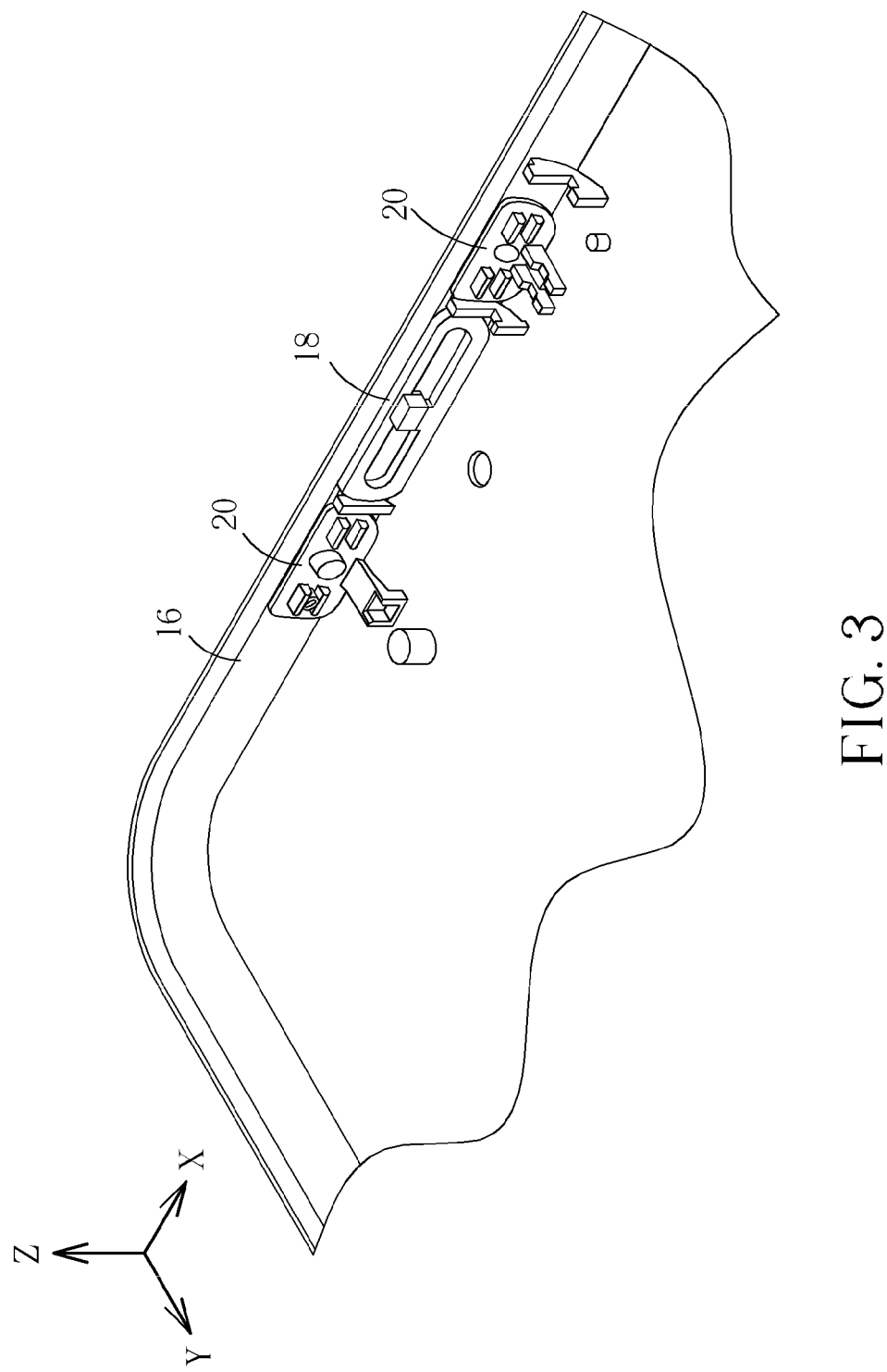
FIG. 3 is an assembly diagram of the first button, the second buttons and the casing according to the embodiment of the present invention.

Please refer to FIG. 3. FIG. 3 is an assembly diagram of the first button 18, the second buttons 20 and the casing 16 according to the embodiment of the present invention. In the embodiment of the present invention, amounts of the open slots 165 of the casing 16 and the switches 141 of the circuit board 14 correspond to an amount of the buttons of the button mechanism 12, which means the casing 16 of the present invention includes three open slots 165 and three switches 141 due to the first button 18 and the second buttons 20.

Figure 4:
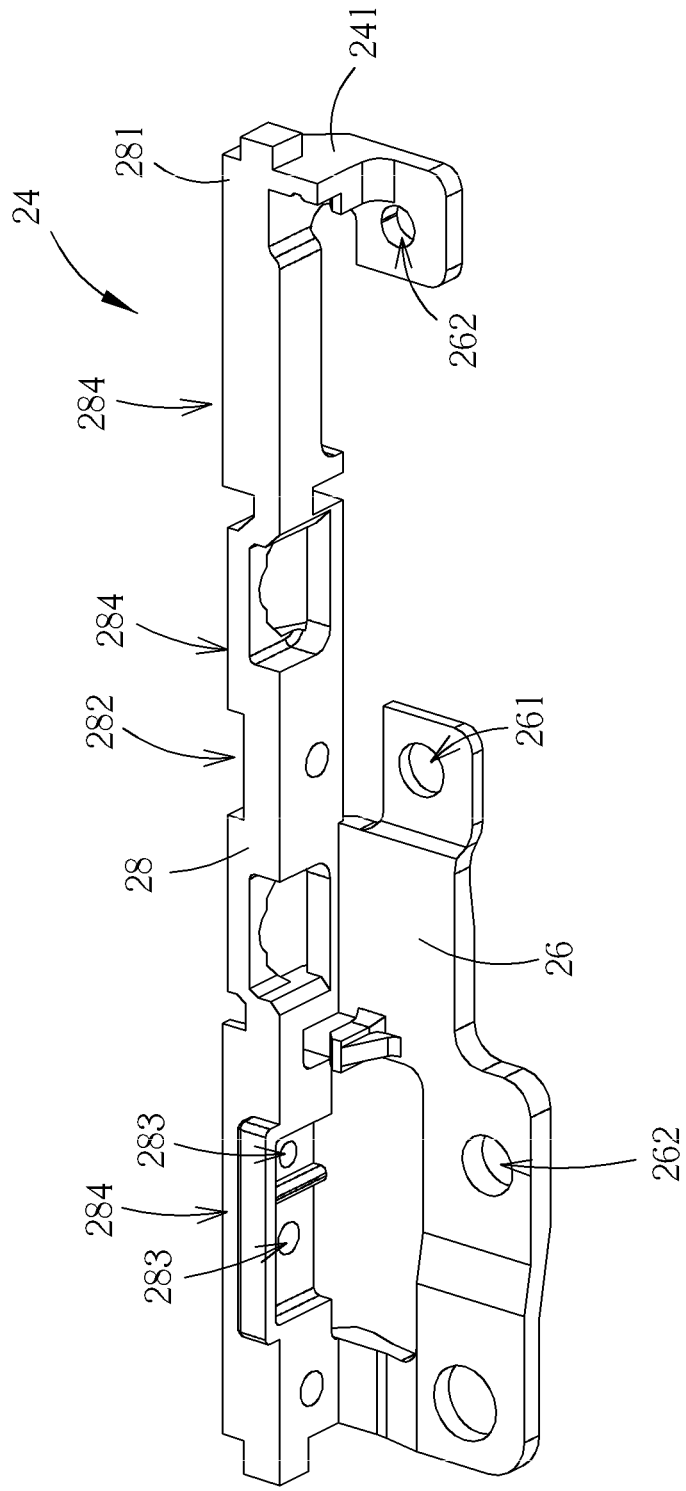
FIG. 4 is a diagram of the supporting component according to the embodiment of the present invention.

The button mechanism 12 further includes a fixing component 22 and a supporting component 24. An end 241 of the supporting component 24 can be engaged with the engaging portion 162 of the casing 16. The fixing component 22 passes through the supporting component 24 to fix the supporting component 24 on the casing 16. Please refer to FIG. 1 to FIG. 4. FIG. 4 is a diagram of the supporting component 24 according to the embodiment of the present invention. The supporting component 24 includes a first part 26 and a second part 28. A piercing hole 261 can be formed on a surface of the first part 26, and the fixing component 22 can pierce through the piercing hole 261 and the lock hole 163 for fixing the first part 26 on the bottom 161 of the casing 16. The second part 28 is connected to the first part 26 and contacts against the first button 18 and the second buttons 20. Generally, the supporting component 24 can be made of conductive material. such as magnesium aluminum material, so the first button 18 and the second buttons 20 can have preferable electromagnetic shielding and grounding connection due to material property of the supporting component 24.

Because the first part 26 is fixed on the casing 16, the second part 28 and the lateral wall 164 of the casing 16 can clamp the first button 18 and the second buttons 20 in a loose fit manner. A plurality of sunken slot 282 can be formed on a lateral surface of the second part 28 adjacent to the casing 16. A position of each sunken slot 282 can correspond to each open slot 165 of the casing 16, and the buttons (the first button 18 and the second buttons 20) can be installed between the corresponding open slot 165 and the sunken slot 282. Thus, the second part 28 can constrain movements of the first button 18 and the second buttons 20 relative to the lateral wall 164 along Y axis, so as to prevent the buttons from separating from the casing 16.

In addition, a contacting structure 281 can be disposed on an upper edge of the second part 28 of the supporting component 24. The contacting structure 281 can constrain movements of the first button 18 and the second buttons 20 relative to the second part 28 along Z axis. The contacting structure 281 can be an element protruding from the second part 28, such as a rectangular protrusion or a spherical protrusion. When the first button 18 contacts the second part 28 and moves along Y axis (or the second button 20 contacts the second part 28 and moves along X axis), the contacting structure 281 can prevent the buttons from moving at irrelevant directions. A plurality of open hole 262 can be further formed on a surface of the first part 26 of the supporting component 24, and a plurality of bosses 166 can be disposed on the bottom 161 of the casing 16. Each open hole 262 sheathes on the corresponding boss 166, so as to constrain a movement of the supporting component 24 relative to the casing 16, and an amount of the fixing component 22 of the electronic device 10 can be decreased effectively.

In the embodiment of the present invention, one fixing component 22 and a combination of the plurality of open holes 262 and bosses 166 can be used to stably fix the supporting component 24 on the casing 16. A sunken slot 282 can be formed on the second part 28 and at a position corresponds to the first button 18. The electronic device 10 can further include a conductive component 30, such as an EMI gasket. The conductive component 30 can be disposed inside the sunken slot 282, and the electromagnetic shielding and the grounding connection of the first button 18 can be increased due to a property of the EMI gasket.

A plurality of cleave hole 283 can be selectively formed on the second part 28 and at positions correspond to one of the second buttons 20, and each cleave hole 283 can face an electronic component of the circuit board 14. Functions of the cleave hole 283 can be designed according to actual demand. For example, the electronic device 10 can further include a light emitting diode (LED), the LED is disposed by the second button 20 and faces the cleave hole 283. When the second button 20 is pressed and actuated, the LED can receive an actuating signal and emit beams. The beams emitted from the LED can transmit through the corresponding cleave hole 283 for prompting reference. A plurality of sunken portions 284 can be disposed on a lateral surface of the second part 28 adjacent to the casing 16. A position of each sunken portion 284 can align with the corresponding open slot 165. The plurality of buttons (the first button 18 and the second buttons 20) is respectively engaged inside the corresponding sunken portion 284, so as to face the corresponding open slot 165, and to be constrained by the supporting component 24.

That is to say, the second button 20 can be a power button. The beams emitted from the LED can transmit through the cleave hole 283 when the second button 20 is pressed for starting the electronic device 10, so the user can watch the beams from the power button to recognize operation states of the electronic device 10. Besides, the user can press a reset button via the other cleave hole 283 as the second button 20 is the power button. The cleave hole 28 can face and align with the LED or the reset button of the circuit board 14, application of the cleave 28 is not limited to the above-mentioned embodiment, and depends on actual demand.

Figure 5:
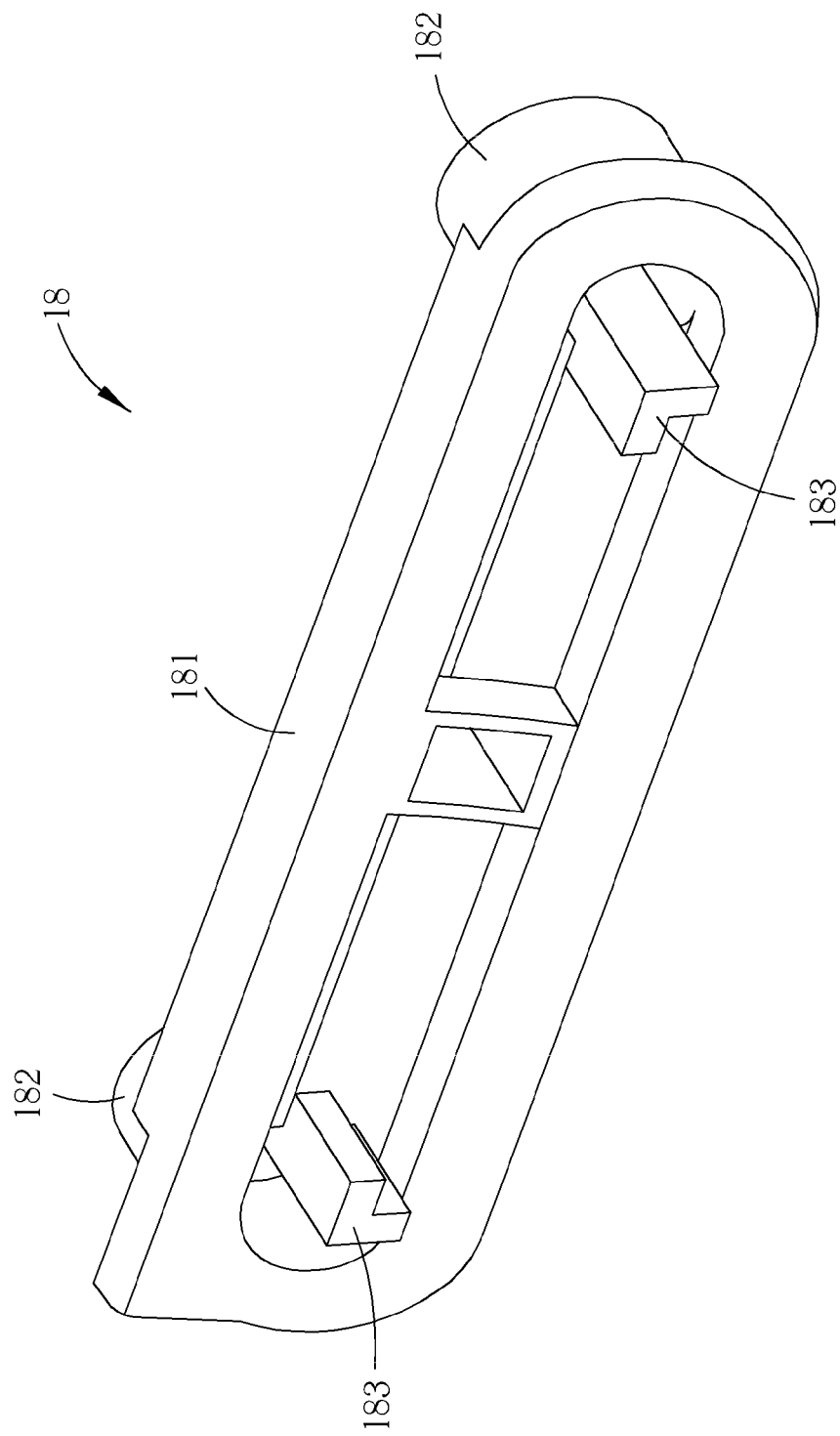
FIG. 5 is a diagram of the first button according to the embodiment of the present invention.
Figure 6:
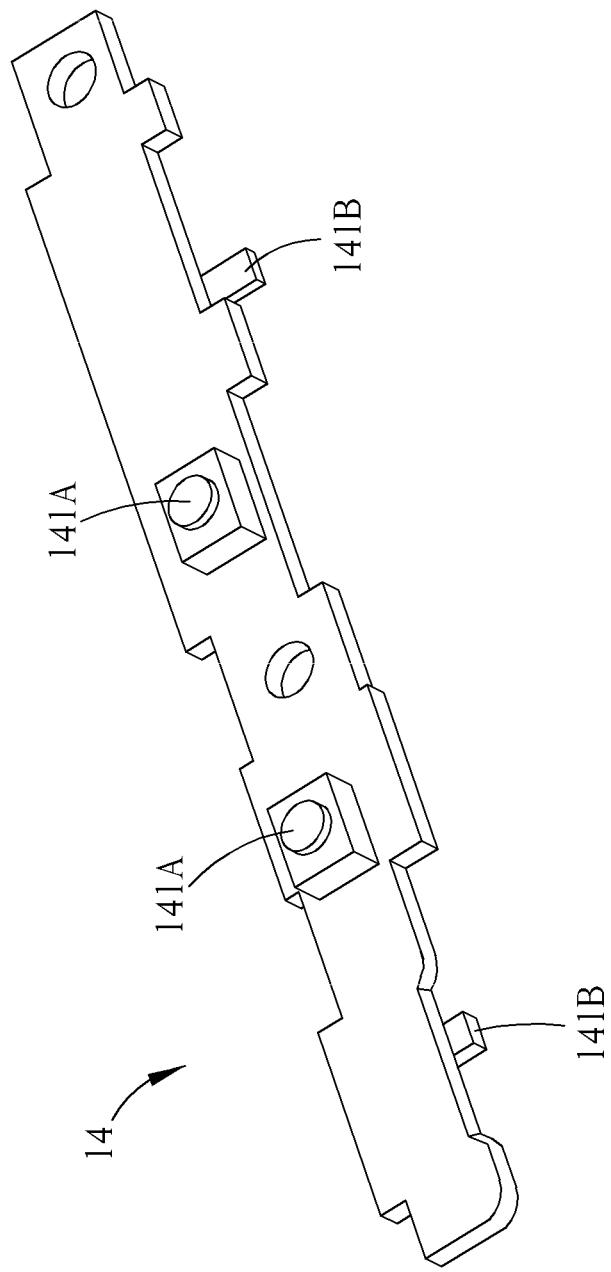
FIG. 6 is a diagram of the circuit board according to the embodiment of the present invention.

Please refer to FIG. 1 to FIG. 5 and FIG. 6. FIG. 5 is a diagram of the first button 18 according to the embodiment of the present invention. FIG. 6 is a diagram of the circuit board 14 according to the embodiment of the present invention. The first button 18 includes a first body 181, two pressing portions 182 and two actuating portions 183. A middle of the first body 181 can align with the sunken slot 182 and contact the conductive component 30. The pressing portions 182 can be respectively disposed on two ends of a side (facing the casing 16) of the first body 181. The actuating portions 183 can be respectively disposed on two ends of the other side of the first body 181, and be located at positions corresponding to the pressing portions 182. The pressing portions 182 can respectively protrude from the corresponding open slot 165 for convenient press operation. The actuating portions 182 can be respectively for actuating the corresponding switches 141A of the circuit board 14.

Generally, the first button 18 can be a volume controller, so the first button 18 is a seesaw structure. The middle of the first body 181 can be a fulcrum, and two ends of the first button 18 are pressed for increasing and decreasing the sound volume. The conductive component 30 can be a pivot of the first body 181. When one of the pressing portions 182 is pressed, the corresponding actuating portion 183 can be moved to touch the corresponding switch 141A, and the other pressing portion 182 moves away from its corresponding actuating portion 183 by the first body 181. Therefore, two pressing portions 182 can not be pressed simultaneously to drive the actuating portions 183, and the first button 18 can be the volume controller.

Figure 7:
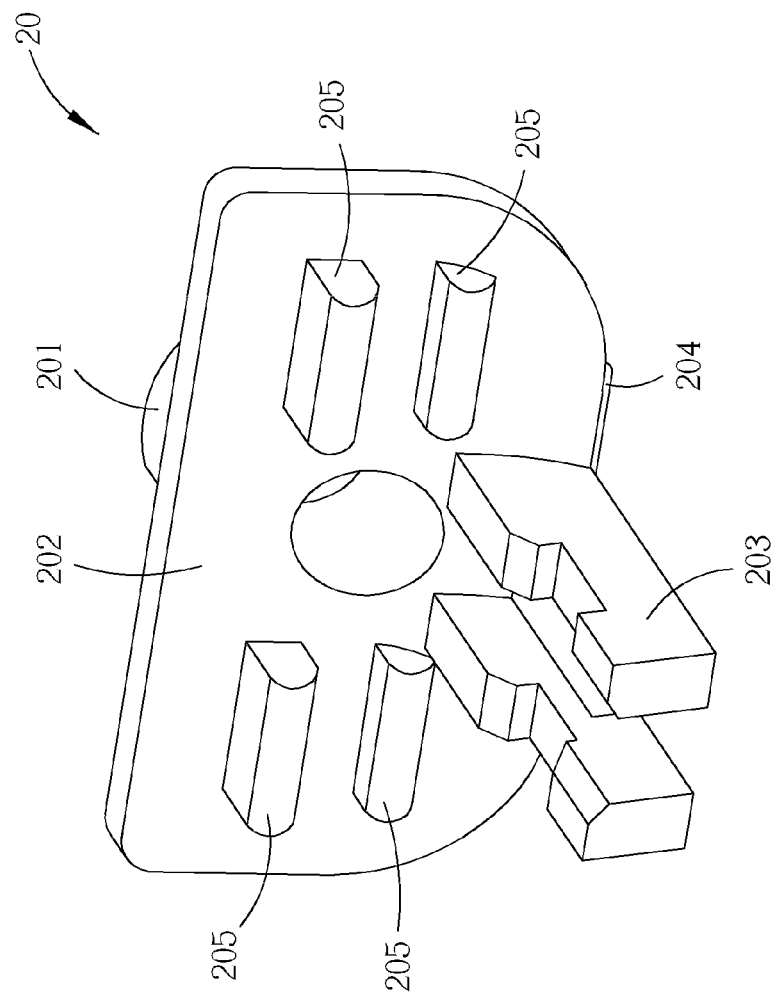
FIG. 7 and FIG. 8 respectively are diagrams of the second button according to different embodiments of the present invention.
Figure 8:
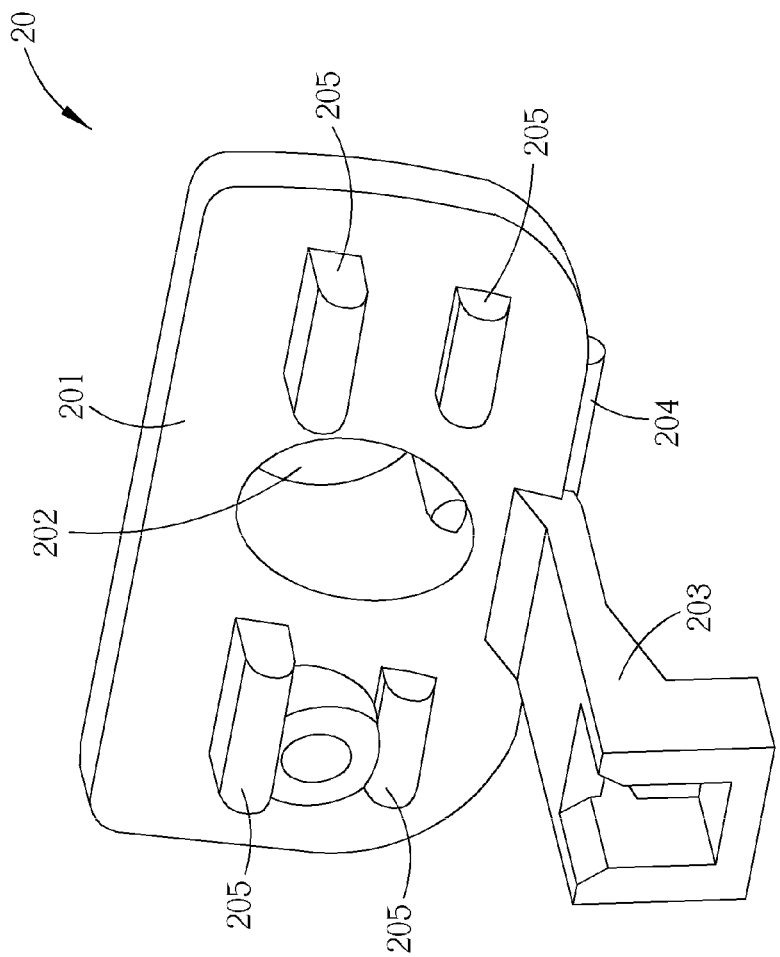

Please refer to FIG. 1 to FIG. 7 and FIG. 8. FIG. 7 and FIG. 8 respectively are diagrams of the second button 20 according to different embodiments of the present invention. The second button 20 can include a second body 201, a pushing portion 202, a buckling portion 203 and a contacting portion 204. A plurality of rib structures 205 can be disposed on a surface of the second body 201 adjacent to the supporting component 24. The second body 201 can slide relative to the smooth surface of the second part 28 via the rib structures 205, so that the second button 20 can move along X axis between the casing 16 and the supporting component 24. The pushing portion 202 can be disposed on a side of the second body 201, and protrude from the open slot 165 for convenient push operation. The buckling portion 203 can be disposed on the other side of the second body 201. The buckling portion 203 can be a protrusion, which stretches along the surface of the second body 201, and its structural length can be across the supporting component 24 for buckling the corresponding switch 141B of the circuit board 14. The contacting portion 204 can be disposed on the low edge of the second body 201 for contacting against the casing 16, so as to constrain the movement of the second body 201 relative to the casing 16 along Z axis.

It should be mentioned that the present invention can effectively economize structural space of the casing 16 for accommodating the second buttons 20, the supporting component 24 and the circuit board 14, which results in that the buckling portion 203 can buckle the switch 141B protruding along Z axis, and the switch 141B is accommodated between the first part 26 and the second part 28, so that a thickness of the button mechanism 12 along Y axis can be decreased. The second buttons 20 can be slidably disposed on the casing 16, and can be applied to the power button or a lock button selectively. For example, the lock button is pressed for lock image rotation displayed by a screen when the electronic device 10 is a tablet computer. Amounts and functions of the second buttons 20 are not limited to the above-mentioned embodiment, and depend on design demand.

Figure 9:
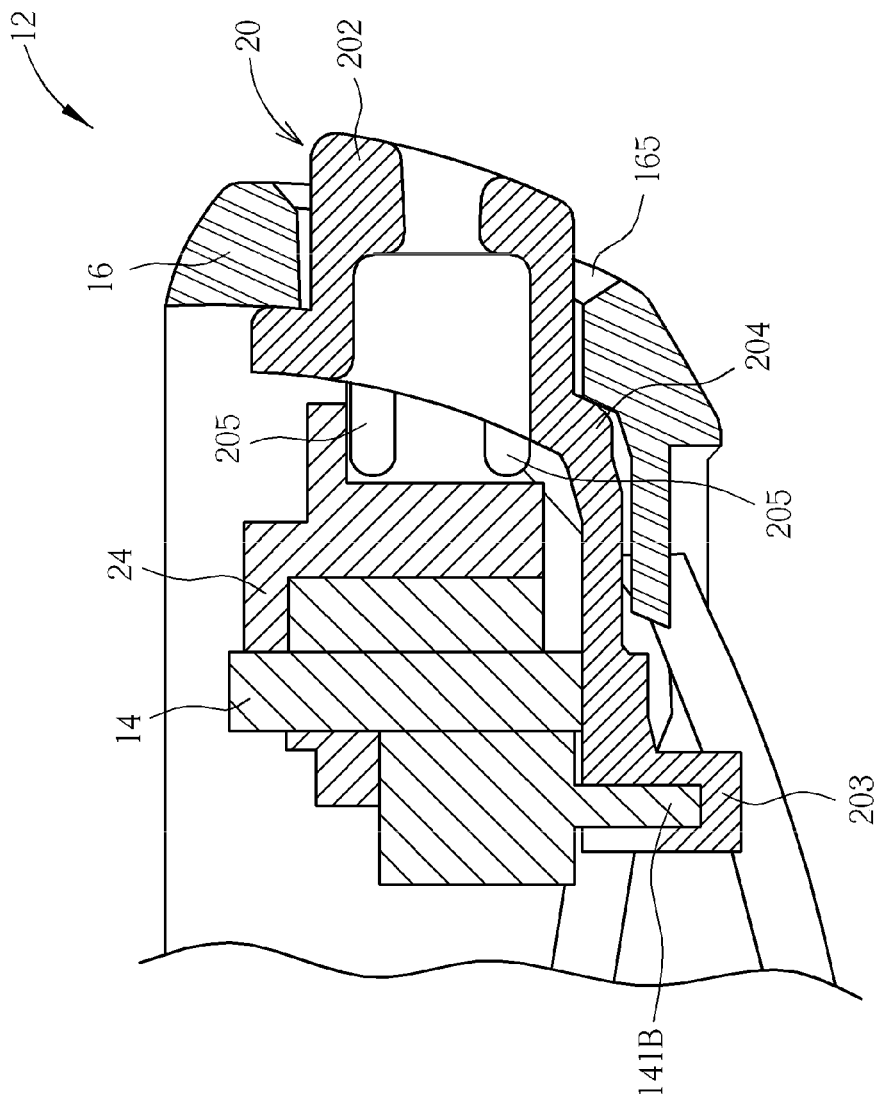
FIG. 9 is a sectional view of the button mechanism according to the embodiment of the present invention.

Please refer to FIG. 9. FIG. 9 is a sectional view of the button mechanism 12 according to the embodiment of the present invention. As shown in FIG. 2 and FIG. 9, the second button 20 (or the first button 18) can be movably disposed inside the open slot 165 on the casing 16, and the pushing portion 202 of the second button 20 can protrude from the open slot 165 for push operation. The supporting component 24 is locked on the bottom 161 of the casing 16, and the supporting component 24 can tightly contact against the second button 20 for preventing the second button 20 from separating from the open slot 165. In addition, the circuit board 14 is fixed on a lateral surface of the supporting component 24 facing the second button 20. The buckling portion 203 of the second button 20 can stretch across the supporting component 24 for buckling the switch 141B of the circuit board 14. Because the plurality of rib structures 205 of the second button 20 can slidably contact the smooth surface of the second part 28 of the supporting component 24, the second button 20 can move relative to the casing 16 along the open slot 165 as being pressed along X axis, so the switch 141B can be actuated by the buckling portion 203, and generate a controlling signal corresponding to a function of the second button 20.

Figure 10:
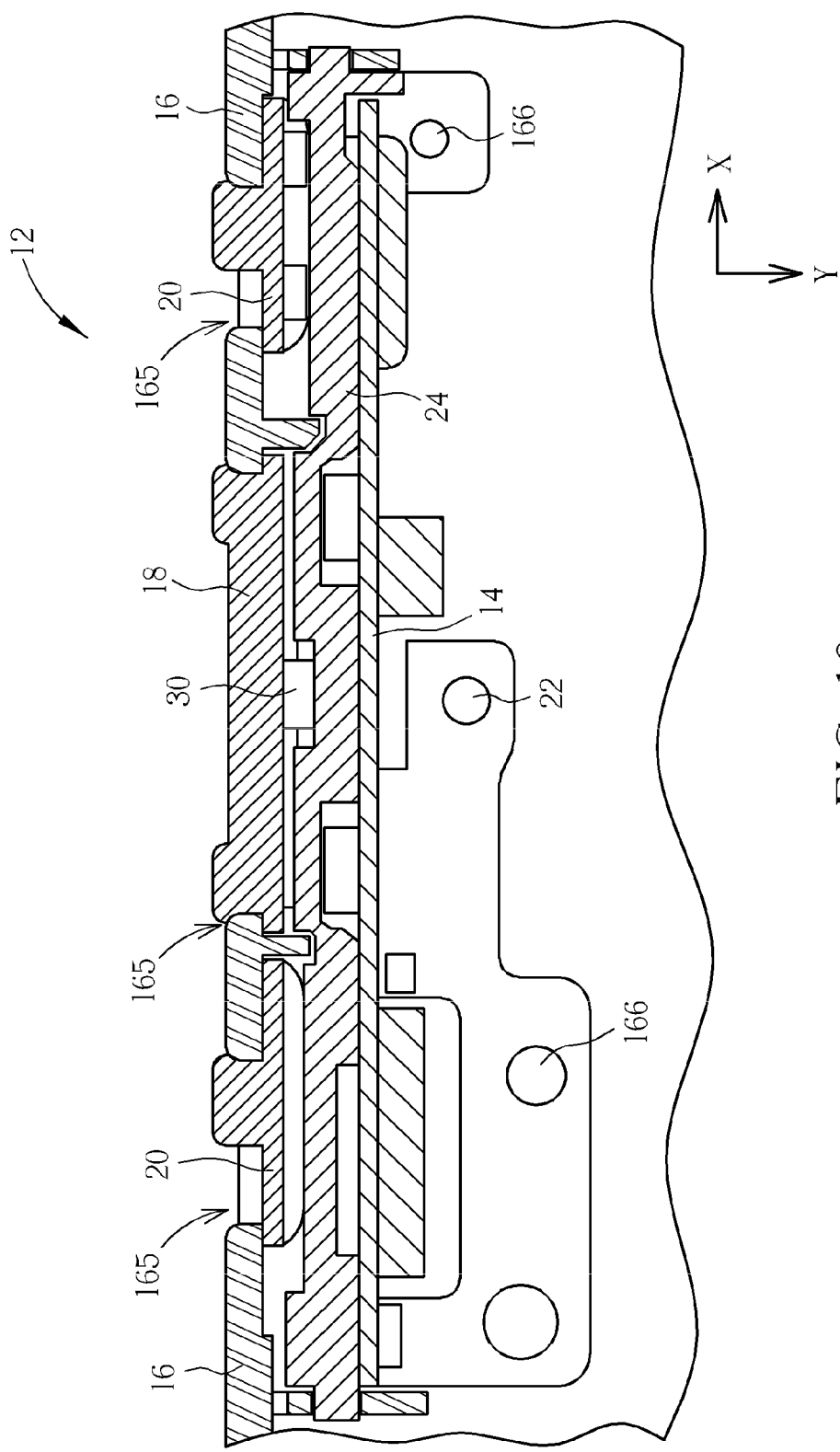
FIG. 10 is a sectional view of the button mechanism in another view angle according to the embodiment of the present invention.

Please refer to FIG. 10. FIG. 10 is a sectional view of the button mechanism 12 in another view angle according to the embodiment of the present invention. The button mechanism 12 utilizes one supporting component 24 to simultaneously fix the first button 18 and the second buttons 20 inside the open slots 165 on the casing 16. The first button 18 utilizes the conductive component 30 to be the fulcrum for forming the seesaw structure. The first button 18 can be the volume controller, and the user can press the left-side pressing portion 202 and the right-side pressing portion 202 to actuate the switches 141A of the circuit board 14 alternatively. The buckling portion 203 of the second button 20 can buckle the switch 141B of the circuit board 14, and the buckling portion 203 can actuate the switch 141B for generating the corresponding controlling signal when the second button 20 is pressed along X axis and moves relative to the casing 16.

Comparing to the prior art, the present invention utilizes one supporting component to fix the plurality of buttons (the first button and the second buttons) for economizing the structural space of the electronic device. The casing, the supporting component and the buttons are integrated to be modularization, so that the button mechanism of the present invention has advantages of easy assembly and low manufacturing cost. A production yield of the present invention can be increased due to modularization design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A button mechanism comprising:
   a casing, an engaging portion being disposed on a bottom of the casing, a lock hole being formed on the bottom of the casing, and a plurality of open slots being formed on a lateral wall of the casing;
   a plurality of buttons movably disposed on the corresponding open slots, the plurality of buttons comprising at least one first button and at least one second button;
   a fixing component; and
   a supporting component, an end of the supporting component being engaged with the engaging portion of the casing, the supporting component comprising:
      a first part, a piercing hole being formed on a surface of the first part, the fixing component passing through the piercing hole and being locked on the lock hole for fixing the first part on the bottom of the casing; and
      a second part connected to the first part and contacting against the plurality of buttons for constraining movements of the plurality of buttons relative to the lateral wall of the casing.

2. The button mechanism of claim 1, wherein a plurality of sunken portions is disposed on a lateral surface of the second part adjacent to the casing, a position of each sunken portion corresponds to the corresponding open slot, and the plurality of buttons is respectively engaged with the corresponding sunken portion.

3. The button mechanism of claim 1, wherein a contacting structure is disposed on an upper edge of the second part of the supporting component for constraining movements of the plurality of buttons relative to the second part.

4. The button mechanism of claim 3, wherein the contacting structure protrudes from a lateral surface of the second part.

5. The button mechanism of claim 1, wherein an open hole is further formed on the surface of the first part of the supporting component, and the open hole sheathes on a boss of the casing.

6. The button mechanism of claim 1, wherein a cleave hole is formed on the second part and at a position corresponding to the second button, the cleave hole faces an electronic component of a circuit board.

7. The button mechanism of claim 1, wherein a sunken slot is formed on the second part and at a position corresponding to the first button, a conductive component is disposed inside the sunken slot.

8. The button mechanism of claim 7, wherein the first button comprises:
   a first body, a middle of the first body contacting against the conductive component disposed inside the sunken slot;
   two pressing portions respectively disposed on two ends of a side of the first body, each pressing portion protruding from the open slot; and
   two actuating portions respectively disposed on two ends of the other side of the first body, each actuating portion being for actuating a switch of a circuit board.

9. The button mechanism of claim 8, wherein the second button comprises:
   a second body, a rib structure being disposed on a surface of the second body adjacent to the supporting component, the second body sliding relative to the second part of the supporting component via the rib structure;
   a pushing portion disposed on a side of the second body, the pushing portion protruding from the open slot; and
   a buckling portion disposed on the other side of the second body for buckling the switch of the circuit board.

10. The button mechanism of claim 9, wherein the second button further comprises:
   a contacting portion disposed on a low edge of the second body for contacting against the casing.

11. The button mechanism of claim 1, wherein the button mechanism comprises one first button and two second buttons, each second button is slidably disposed inside the corresponding open slot of the casing and located between the casing and the second part of the supporting component.

12. An electronic device comprising:
   a button mechanism comprising:
      a casing, an engaging portion being disposed on a bottom of the casing, a lock hole being formed on the bottom of the casing, and a plurality of open slots being formed on a lateral wall of the casing;
      a plurality of buttons movably disposed on the corresponding open slots of the casing, the plurality of buttons comprising at least one first button and at least one second button;
      a fixing component; and
      a supporting component, an end of the supporting component being engaged with the engaging portion of the casing, the supporting component comprising:
         a first part, a piercing hole being formed on a surface of the first part, the fixing component passing through the piercing hole and being locked on the lock hole for fixing the first part on the bottom of the casing; and
         a second part connected to the first part and contacting against the plurality of buttons for constraining movements of the plurality of buttons relative to the lateral wall of the casing; and
   a circuit board disposed on the supporting component, the circuit board comprising a plurality of switches, the first button and the second button being respectively for driving the corresponding switches.

13. The electronic device of claim 12, wherein a contacting structure is disposed on an upper edge of the second part of the supporting component for constraining movements of the plurality of buttons relative to the second part.

14. The electronic device of claim 12, wherein an open hole is further formed on the surface of the first part of the supporting component, and the open hole sheathes on a boss of the casing.

15. The electronic device of claim 12, wherein a cleave hole is formed on the second part and at a position corresponding to the second button, the cleave hole faces an electronic component of the circuit board.

16. The electronic device of claim 12, wherein a sunken slot is formed on the second part and at a position corresponding to the first button, the electronic device further comprises a conductive component, and the conductive component is disposed inside the sunken slot.

17. The electronic device of claim 16, wherein the first button comprises:
  a first body, a middle of the first body contacting against the conductive component;
  two pressing portions respectively disposed on two ends of a side of the first body, each pressing portion protruding from the open slot; and
  two actuating portions respectively disposed on two ends of the other side of the first body, each actuating portion being for actuating the corresponding switch of the circuit board.

18. The electronic device of claim 17, wherein the second button comprises:
  a second body, a rib structure being disposed on a surface of the second body adjacent to the supporting component, the second body sliding relative to the second part of the supporting component via the rib structure;
  a pushing portion disposed on a side of the second body, the pushing portion protruding from the open slot; and
  a buckling portion disposed on the other side of the second body for buckling the corresponding switch of the circuit board.

19. The electronic device of claim 18, wherein the second button further comprises:
  a contacting portion disposed on a low edge of the second body for contacting against the casing.

20. The electronic device of claim 12, wherein the button mechanism comprises one first button and two second buttons, each second button is slidably disposed inside the corresponding open slot of the casing and located between the casing and the second part of the supporting component.

* * * * *

UNITED STATES PATENT AND TRADEMARK OFFICE
CERTIFICATE OF CORRECTION

PATENT NO. : 8,723,064 B2
APPLICATION NO. : 13/596058
DATED : May 13, 2014
INVENTOR(S) : Yen-Chang Cheng et al.

It is certified that error appears in the above-identified patent and that said Letters Patent is hereby corrected as shown below:

On the title page, item (75), correct the name of the second inventor from "Chih-Peng Chen" to --Chih-Ping Chen--.

Signed and Sealed this
Fifth Day of August, 2014

Michelle K. Lee
*Deputy Director of the United States Patent and Trademark Office*